March 3, 1964

R. KNORR ETAL 3,122,979

AUTOMATIC CAMERA CONTROLS

Filed Dec. 27, 1960

INVENTORS.
ROLAND KNORR
ULRICH W. AUER
FRIDOLIN HENNIG

BY Michael S. Striker
Atty

March 3, 1964  R. KNORR ETAL  3,122,979
AUTOMATIC CAMERA CONTROLS
Filed Dec. 27, 1960  3 Sheets-Sheet 2

INVENTOR.
ROLAND KNORR
ULRICH W. AUER
FRIDOLIN HENNIG

BY Michael S. Striker
Atty

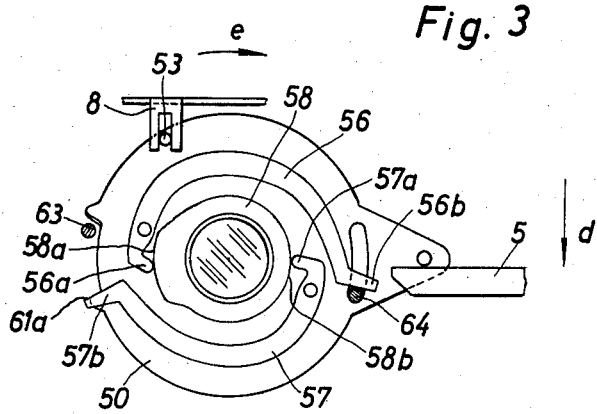

United States Patent Office

3,122,979
Patented Mar. 3, 1964

3,122,979
AUTOMATIC CAMERA CONTROLS
Roland Knorr, Munich, Germany, Ulrich W. Auer, Geneva, Switzerland, and Fridolin Hennig, Munich, Germany, assignors to Agfa Aktiengesellschaft, Leverkusen-Bayerwerk, Germany
Filed Dec. 27, 1960, Ser. No. 78,595
Claims priority, application Germany Dec. 30, 1959
15 Claims. (Cl. 95—10)

The present invention relates to cameras.

More particularly, the present invention relates to automatic cameras capable of automatically providing combinations of exposure time and exposure aperture which will provide proper exposures according to the lighting conditions.

In cameras of this type the best possible photographs are not always obtained if there is only one predetermined set of combinations of exposure time and exposure aperture according to variations in the lighting conditions. For example, where the subject being photographed is such that a considerable amount of sharpness over a substantial depth of field is desired, such a depth of field will not be provided if the predetermined combination of exposure time and exposure aperture is such that the exposure aperture remains at all times at a relatively large size. On the other hand, if the subject is moving rapidly then the exposure time should be quite small and here again a small exposure time is not always obtainable with the predetermined combinations of exposure time and exposure aperture which cannot be varied.

It is accordingly a primary object of the present invention to provide a camera of the above type which enables the operator to make a choice as to the combinations of exposure time and exposure aperture.

It is another object of the present invention to provide a camera of the above type which allows the operator to choose between two sets of combinations of exposure time and exposure aperture, one set providing the best possible photographs from the standpoint of obtaining the largest possible depth of field and the other set providing the best possible photographs from the standpoint of a rapidly moving subject.

An additional object of the present invention is to provide a structure capable of accomplishing the above objects and at the same time composed of simple rugged elements which are very reliable in operation.

With the above objects in view the invention includes, in a camera, an exposure time setting means which is movable from a rest position to a predetermined range of movement and an exposure aperture setting means which is movable from a predetermined rest position through a predetermined range of movement. A drive means is provided, and this drive means is adapted to be controlled in its operation according to the lighting conditions, and also the drive means is released for operation by the operator. A motion transmitting means is operatively connected to the drive means to be driven thereby and the motion transmitting means is movable between two positions. In one of its positions the motion transmitting means will, when driven by the drive means, cooperate first with one of the above setting means to move the latter through its predetermined range of movement and then with the other of the setting means so as to move this other setting means through its predetermined range of movement, while in the second position of the motion transmitting means it will move the second one of the above-mentioned motion transmitting means first through its predetermined range of movement and will then finally remove the remaining setting means through its predetermined range of movement. A manually operable selecting means is available to the operator for placing the motion transmitting means in one or the other of its positions so that in this way the structure will operate so as to actuate first the exposure time setting means and then the exposure aperture setting means or so as to actuate first the aperture setting means and then the time setting means. Thus, assuming, for example, that in the rest position of both setting means the largest exposure aperture and the longest exposure time are provided, then by setting the motion transmitting means in the manner described above it is possible to provide an operation where first, for example, the exposure aperture will be reduced from its maximum to its minimum size before the exposure time is reduced, so that in this way the best possible photograph from the standpoint of depth of field will be obtained, while if the other type of operation is selected the exposure time will first be reduced from its maximum to its minimum before the aperture is reduced so that with this type of operation the best possible photograph from the standpoint of a rapidly moving subject will be obtained.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 3 is a diagrammatic illustration of the structure of FIG. 2 in one position; and FIG. 4 is a diagrammatic illustration of the structure of FIG. 2 in another position.

Figure 1:
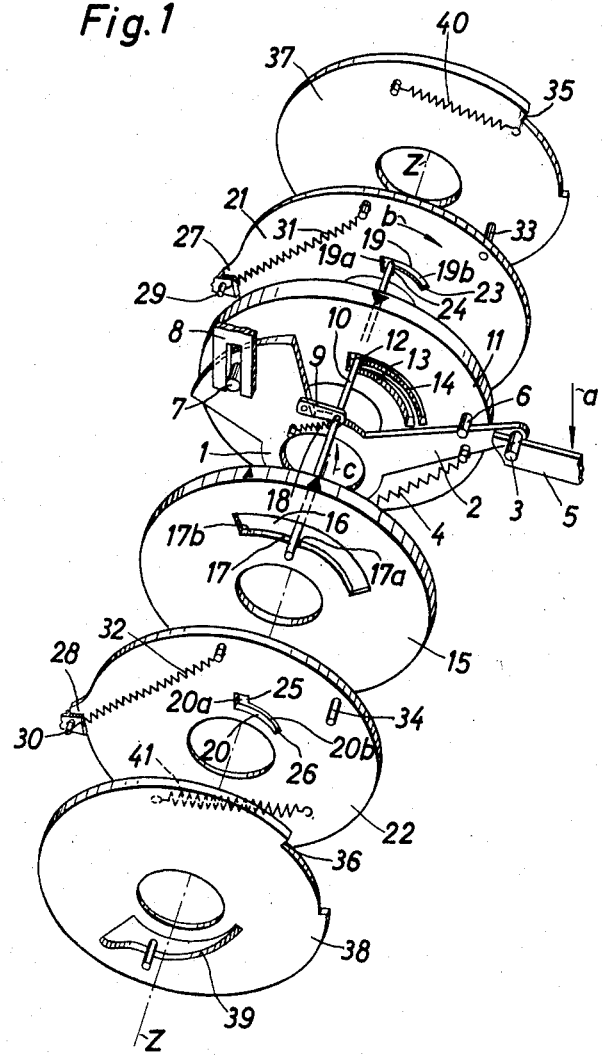
FIG. 1 is an exploded perspective illustration of one possible embodiment of a structure according to the present invention.

Referring now to FIG. 1, it will be seen that the components of the embodiment of the invention illustrated therein includes a plurality of rings all of which are supported for rotary movement about the optical axis Z—Z by any suitable supporting structure such as the tubes which form part of the objective assembly of the camera. The rotary rings include a drive means formed by the rotary member 1 which is provided with a radial projection 2, and this radial projection carries a pin 3 which is maintained by the drive spring 4 against an arm 5. The drive spring 4 is simply an elongated coil spring fixed at one end to a pin which is carried by the extension 2 of the ring 1, and at its opposite end the drive spring 4 is fixed to a stationary part of the camera. The arm 5 forms part of a manually operable release means for releasing the drive means 1 to the force of the spring 4, and the drive means is maintained in its rest position shown in FIG. 1 by a return spring which is connected to the structure which carries the arm 5. Thus, when the camera is to be operated the operator will depress the structure which carries the arm 5 so as to move this arm downwardly in the direction of the arrow $a$ of FIG. 1, in opposition to the return spring, and this will result in release of the drive means 1 to the force of the spring 4 which will turn the drive means 1 in a clockwise direction, as viewed in FIG. 1. The return spring which is connected to the structure which carried the arm 5 is substantially stronger than the spring 4 so that when the operator releases the structure connected to the arm 5 the return spring will return the projection 2 and the ring 1 to the angular position shown in FIG. 1, and during this return movement the spring 4 will be tensioned so as to have the force required to drive the ring 1 during the next downward movement of the arm 5. A stationary pin 6 is carried by a stationary plate 11, and the return spring which is connected to the structure which carries the arm 5 acts through the arm 5 on the pin 3 to maintain the projection 2 in engagement with the stationary pin 6, so that in this way the rest position of the drive means 1 is determined.

In addition, the rotary drive means 1 fixedly carries a pin 7 which is received in a bifurcated portion of a member 8 which is guided for movement to the right and left, as viewed in FIG. 1 and which forms part of a well-known scanning structure for scanning the position of a pointer of a galvanometer which is actuated by a photocell which receives the light which reaches the camera so that this scanning structure will control the extent to which the pin 7 can move and will thus control the extent to which the spring 4 can turn the drive means 1. In this way the extent of turning of the drive means 1 is determined by the lighting conditions and thus the drive means is controlled automatically to turn through an angle which is indicative of the particular lighting conditions.

Thus, when the operator moves the arm 5 downwardly the pin 3 will follow the arm 5 until the scanning structure 8 prevents further movement of the pin 3 and then of course the operator may continue to move the arm 5 downwardly but the pin 3 will not follow and the drive means 1 will be retained at an angular position determined by the lighting conditions.

The drive means 1 also pivotally carries a lever 9, and this lever carries an elongated motion transmitting rod 10 which extends substantially parallel to the optical axis, and this rod 10 forms a motion transmitting means for a purpose described below.

This stationary plate 11 is formed with a radial slot 12 through which the rod 10 extends and along which the rod 10 is movable, and in addition the plate 11 is formed with a pair of arcuate slots 13 and 14 which communicate with and extend from the slot 12 and which respectively extend along a pair of circles which are concentric and which have their common center located in the optical axis Z—Z. When the rod 10 is at the same radial distance from the optical axis as the slot 13 the rod 10 will move along this slot to describe part of a cylinder, while when the rod 10 is at the same radial distance from the optical axis as the slot 14, the rod 10 will move along this slot 14 to describe a second cylinder whose diameter is larger than the first cylinder.

The rod 10 has two positions in one of which it is at the same radial distance from the optical axis as the slot 13 and in the other of which it is at the same radial distance from the optical axis as the slot 14, and in order to locate the motion transmitting rod in one or the other of these positions a manually operable selecting means is provided. This selecting means takes the form of a manually turnable ring 15 supported for rotary movement in any suitable way as by surrounding and being turnable on the lens-carrying tube of the objective, and this ring 15 is formed with a cutout 16 through which the rod 10 extends as illustrated in FIG. 1. The lower edge 17 of the cutout 16 forms a camming edge, and the end region 17a of the camming edge 17 is located nearer to the optical axis than the opposite end region 17b of the camming edge 17. A spring 18 is connected at one end to a pin carried by the drive means 1 and at its opposite end to the rod 10 so as to maintain this rod at all times in engagement with the camming edge 17. When the ring 15 is located in the angular position illustrated in FIG. 1 where a symbol carried at the periphery of the ring 15 is aligned with a stationary index carried by the periphery of the plate 11, the radial distance of the end portion 17a of the camming edge 17 from the optical axis is such that the motion transmitting rod 10 is at the lower portion of the slot 12 in alignment with the slot 13 of smaller diameter. When the selecting disc 15 is turned in a clockwise direction, as viewed in FIG. 1 so as to align the secondary symbol at the periphery of the disc 15 with the stationary index of the plate 11, the end region 17b of the camming edge 17 will move into engagement wtih the rod 10 so as to move the latter in opposition to the spring 18 in the direction of the arrow c of FIG. 1, the lever 9 turning at this time with respect to the ring 1. The motion transmitting rod 10 will now move substantially radially along the slot 12 away from the optical axis into alignment wtih the end of the slot 14 which communicates with the slot 12.

The structure of FIG. 1 also includes an exposure aperture setting means and an exposure time setting means. The exposure aperture setting means includes the rotary ring 21 which is formed with the cutout 19, while the exposure time setting means includes the rotary ring 22 which is formed with the cutout 20. The cutouts 19 and 20 respectively have radial portions 19a and 20a which are respectively aligned with the radial slot 12 when the parts are in their position of rest, and the cutouts 19 and 20 also include arcuate portions 19b and 20b, respectively. As a result the cutout 19 provides the ring 21 with a pair of shoulders 23 and 24, while the cutout 20 provides the ring 22 with a pair of shoulders 25 and 26. When the exposure time setting means and the exposure aperture setting means are operated from the drive means both of these means move in the direction of the arrow b, and the motion transmitting means 10 also moves in this direction when driven by the drive means 1. It will be noted that the stop 23 is displaced from the stop 24 in the same direction, while the stop 26 is displaced from the stop 25 also in the same direction. The arcuate slot portion 19b of the cutout 19 is at the same radial distance from the optical axis as the slot 14, while the arcuate portion 20b of the cutout is at the same radial distance from the optical axis as the slot 13.

The rings 21 and 22 are respectively provided with radial projections 27 and 28 which respectively engage stationary stops 29 and 30 carried by the camera. A spring 31 is connected at one end to a pin carried by the ring 21 and at its opposite end to the stop 29 so as to urge the ring 21 in that direction which maintains the stop 27 yieldably in engagement with the stop 29. A spring 32 is connected at one end to a pin carried by the plate 22 and at its opposite end to the stop 30 to urge the ring 22 to turn in that direction which yieldably maintains the stop 28 in engagement with the stop 30. In this way the springs 31 and 32 act respectively on the rings 21 and 22 to maintain the latter in predetermined rest positions.

The exposure aperture setting means includes in addition to the ring 21 a concentric rotary ring 37 formed with a peripheral notch into which extends a pin 33 which is fixed to the ring 21 and which is adapted to engage the end edge 35 of the radial notch of the ring 37. This ring 37 is operatively connected in an unillustrated and well-known manner to the blades of the diaphragm for turning these blades so as to increase or decrease the size of the exposure aperture, and a spring 40 is connected at one end to a pin carried by the ring 37 and by its opposite end to the pin 33 so as to urge the rings 21 and 37 to turn with respect to each other in that direction which maintains the pin 33 against the stop edge 35.

The exposure time setting means includes in addition to the ring 22 the ring 38 which is formed with a peripheral notch into which extends the pin 34 which is fixed to the ring 22, and this pin 34 is adapted to engage the end edge 36 of the radial notch formed in the periphery of the plate 38. A spring 41 is connected at one end to the plate 38 and at its opposite end to the pin 34 so as to yieldably maintain the latter in engagement with the edge 36 and thus the spring 41 urges the rings 22 and 38 to turn one with respect to the other to a predetermined position one with respect to the other. As is indicated in FIG. 1, the ring 38 is formed with a cutout having a camming edge 39 which cooperates with an adjustable pin of the exposure time controlling structure for moving this pin so as to adjust the exposure time when the ring 38 turns.

Assuming that the parts are in the position shown in FIG. 1 and that an exposure is to be made, the operator will depress the structure which carries the arm 5 so as to move the latter downwardly in opposition to the unillustrated return spring in the direction of the arrow $a$ and this will result in release of the drive means 1 to the spring 4. As a result the drive means 1 will turn in the direction of the arrow $b$ shown in FIG. 1, and it will be noted that in the illustrated position of the parts the motion transmitting member 10 engages the shoulder 24 of the cutout 19 so that the turning of the drive means 1 is transmitted through the motion transmitting means 10 to the ring 21 of the exposure aperture setting means, and through the spring 40 the ring 37 turns with the ring 21 and thus turns the blades of the diaphragm so as to change the size of the exposure aperture. At this time the motion transmitting member 10 will turn from the slot 12 into and along the slot 13, and at this time the motion transmitting member 10 will simply move along the slot 20 without turning the ring 22, so that the exposure time remains unchanged.

Assuming that the lighting conditions are such that the bifurcated portion of the member 8 acts through the pin 7 on the drive means 1 to stop the turning thereof before the pin 10 reaches the shoulder 26 of the cutout 20, then only the exposure aperture will be changed and the exposure time will remain constant at its initial position, and the operator will then trip the shutter through any suitable shutter release so as to make the exposure. However, if there is so much light available that after the exposure aperture has been adjusted through its entire range of adjustment it is still necessary to change the amount of light reaching the camera, then the ring 37 will reach the angular position corresponding to the end position of the diaphragm and will not be able to turn further. The continued turning of the drive means 1 will then cause the ring 21 to turn with respect to the ring 37 in opposition to the spring 40. At the instant when the diaphragm has reached its end position the motion transmitting rod 10 engages the shoulder 26 of the cutout 20 so that during the continued turning of the motion transmitting member 10 with the drive means 1 the ring 22 will be turned so as to cause the ring 38 to turn and thus change the exposure time. Assuming that in their rest positions the exposure aperture setting means provides the largest aperture and the exposure time setting means provides the longest exposure time, then it is clear that with the parts in the position shown in FIG. 1 the exposure aperture will first be reduced to its smallest size and then the exposure time will be reduced, so that with the parts shown in the position of FIG. 1 the greatest possible depth of field will be provided. When the operator releases the structure carrying the arm 5 to the return spring, the arm 5 returns to the position shown in FIG. 1 and also returns the drive means 1 to the position shown in FIG. 1, and of course the member 8 of the scanning structure will also return to the rest position which releases the pointer of the galvanometer for swinging movement. In addition the springs 31 and 32 will act on the exposure aperture setting means and exposure time setting means to return both of these setting means to their starting positions, and thus the structure is now ready for the next exposure.

Assuming that a rapidly moving subject is to be photographed, then the operator will turn the selecting means 15 so that the region 17$b$ of the camming edge 17 will engage the rod 10 and move it away from the optical axis to the radial distance therefrom of the slot 14. At this time the rod 10 will have moved into engagement with the shoulder 25 and into alignment with the slot 19$b$ of the ring 21. Now when the operator moves the arm 5 downwardly the turning of the drive means 1 will cause the rod 10 to move freely along the slot 19$b$ without actuating the exposure aperture setting means, and the rod 10 will at this time move along the slot 14 so as to be guided by the member 11. Because it is in engagement with the shoulder 25, the rod 10 will at this time turn the ring 22 so as to cause the latter to act through the spring 41 on the ring 38 to reduce the exposure time. This operation will continue until the smallest exposure time is reached, and then if the lighting conditions require a further reduction in the amount of light reaching the camera the drive means 1 will continue to turn and at the instant when the smallest exposure time is reached the rod 10 will engage the shoulder 23 so as to start turning the ring 21 and thus reduce the size of the exposure aperture. At this time the ring 38 cannot turn further since it is in the angular position corresponding to the shortest exposure time, and therefore the ring 22 will turn with respect to the ring 38 and in opposition to the spring 41 which stretches at this time. Thus, with the parts in the position where the rod 10 initially engages the shoulder 25, a photograph will be provided with that combination of exposure time and exposure aperture which includes the smallest possible exposure time and which therefore will provide the best possible photograph of a rapidly moving subject.

In a specific camera, for example, the exposure time settings may range from $\frac{1}{30}$ to $\frac{1}{500}$ sec. while the aperture settings may range from 2.8 to 22, there being, for example, settings of $\frac{1}{60}$, $\frac{1}{125}$, and $\frac{1}{250}$ sec. between the end settings for the exposure time and aperture settings of 4, 5.6, 8, 11 and 16 between the end aperture settings. With this camera, in order to provide exposures with the greatest depth of field, the aperture of 22 is maintained with exposure times ranging from $\frac{1}{500}$ to $\frac{1}{30}$ sec., and in this case in the event that a proper exposure will not be made in this range of settings the shortest exposure time of $\frac{1}{30}$ sec. is maintained while the aperture is enlarged beyond the 22 setting. On the other hand, where the operator has selected to make exposures for a rapidly moving subject, the exposure time of $\frac{1}{500}$ sec. is maintained throughout the range of aperture settings from 22 to 2.8, and in this event if a proper exposure will not be made it is possible to maintain the aperture at 2.8 while increasing the exposure time all the way up to $\frac{1}{30}$ sec.

Figure 2:
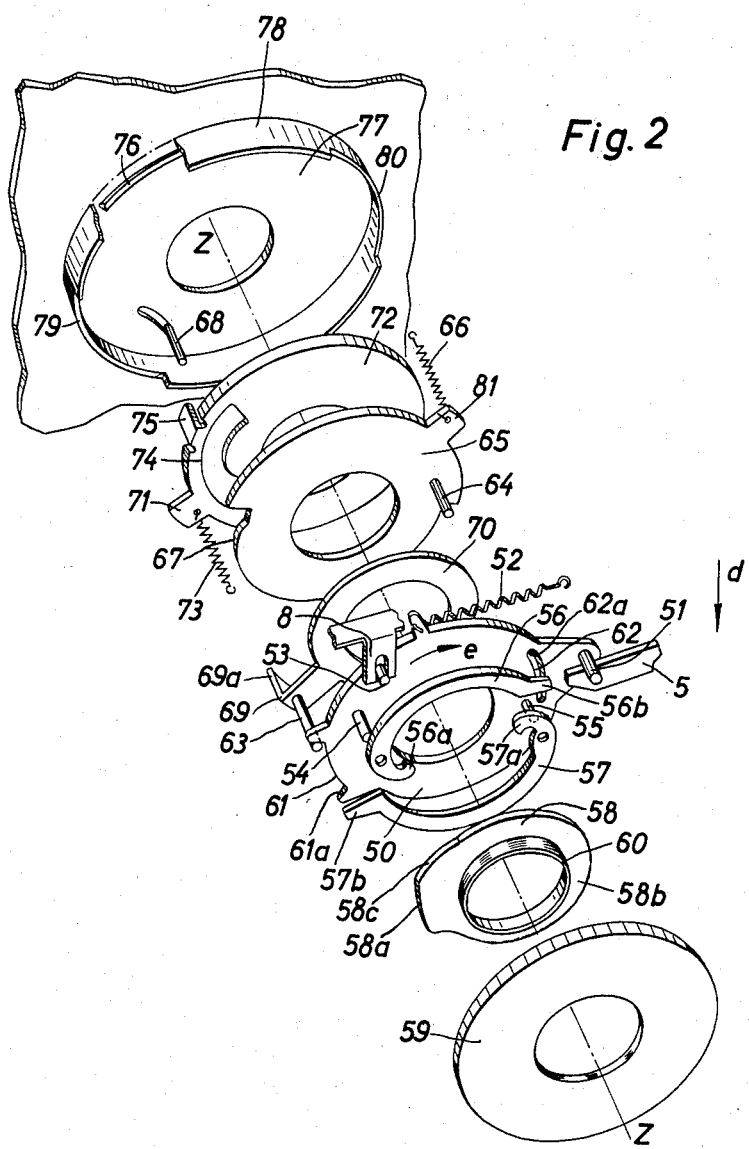
FIG. 2 is an exploded perspective illustration of another embodiment of a structure according to the present invention.

Referring now to FIGS. 2-4, there is illustrated therein a second embodiment of the invention which also includes a number of annular elements all of which are supported for rotary movement about the optical axis Z—Z, as indicated in FIG. 2. The drive means of this embodiment includes the ring 50 which is driven by the spring 52 hooked at one end onto a radial projection at the periphery of the ring 50 and at its opposite end onto a stationary pin or the like carried by the camera. The ring 50 fixedly carries a pin 51 which is maintained in engagement with the arm 5 by the spring 52, and the parts are retained in their rest position by the return spring which is connected to the structure which carries the arm 5 and which is stronger than the spring 52. In addition the ring 50 fixedly carries a pin 53 received in a bifurcated portion of the member 8 of the scanning structure, as was described above in connection with FIG. 1, and of course the arm 5 of the FIG. 2 is identical with the arm 5 of FIG. 1 and is connected to the same structure and operated in the same way.

The drive ring 50 of FIG. 2 fixedly carries the pair of pins 54 and 55 which extend parallel to the optical axis, which are located at diametrically opposed parts of the ring 50, and which serve to pivotally support a pair of motion transmitting members 56 and 57 which form the motion transmitting means of the embodiment of FIGS. 2–4. Each of the motion transmitting members 56 and 57 is in the form of a substantially semi-circular, two-armed lever. One end of each of the motion transmitting levers 56 and 57 terminates in a cam follower portion 56a and 57a, respectively, while the other end 56b and 57b acts to transmit the drive in a manner described below. The cam follower portions 56a and 57a of the motion transmitting levers cooperate with a cam 58 fixedly carried by a ring 60 which is turnably supported, for example, on the lens-carrying tube of the objective, and the ring 60 is also connected with a manually turnable ring 59 which is accessible to the operator so that by turning the ring 59 the operator can control the angular position of the cam 58.

The ends 56b and 57b of the motion transmitting levers cooperate with the driving portions 64 and 63, respectively, of the exposure time setting means and the exposure aperture setting means of the embodiment of FIG. 2, and these driving portions 63 and 64 correspond with the driving portions formed by the shoulders 23—26 of the embodiment of FIG. 1. Thus, the driving portion 64 is in the form of a pin extending parallel to the optical axis and fixedly carried directly by the ring 65 which forms the exposure time setting means of the embodiment of FIGS. 2–4. This ring 65 is connected to one end of the spring 66 whose opposite end is connected to a stationary part of the camera, so that this spring 66 maintains the ring 65 in a predetermined rest position. The exposure time setting ring 65 has a camming curve 67 which engages a pin 68 of an unillustrated and well-known exposure time controlling structure, so that when the ring 65 turns the camming edge 67 will move the pin 68 so as to set the exposure time in a well-known manner.

The driving portion 63 is in the form of an elongated pin extending parallel to the optical axis and in this case fixedly carried by a radial projection 69 of an intermediate ring 70 supported for rotary movement about the optical axis and forming part of the exposure aperture setting means of the embodiment of FIGS. 2–4. The radial projection 69 has an axially extending portion provided with an edge 69a which bears against a projection 71 of a ring 72 which is also supported for rotary movement about the optical axis. The ring 72 is yieldably maintained in a predetermined rest position by the return spring 73 which is connected at one end to the projection 71 and at its opposite end to a stationary part of the camera, and this spring 73 maintains the projection 71 in engagement with the edge 69a of the projection 69 of the intermediate ring 70. The ring 72 of the exposure aperture setting means is formed with an arcuate cutout 74 through which the pin 68 extends into engagement with the camming edge 67, and the size of the cutout 74 is such that in all positions of the parts the pin 68 is never engaged by the ring 72. The ring 72 is provided with an axially extending projection 75 which extends through an arcuate slot 76 formed in a wall of the camera, this wall 77 forming part of the shutter housing, and at the side of the wall 77 which is not visible in FIG. 2 the projection 75 engages the rotary blade-adjusting ring of a well-known iris diaphragm structure so that the turning of the ring 72 will result in setting of the diaphragm. However, if desired, the ring 72 itself can form the blade-adjusting ring of the diaphragm. Moreover, instead of setting the exposure time by means of the camming edge 67 and the pin 68, it is possible to provide other structures. Thus, the structure shown is capable of setting the exposure time of a between-the-lens shutter, while a different type of known exposure time setting structure may be used for setting a focal plane shutter.

In order to limit the turning of the exposure time setting means and the exposure aperture setting means to a predetermined range of angular movement, the wall 77 of the shutter housing fixedly carries a sleeve 78 formed with a pair of notches 79 and 80. The projection 71 extends into the notch 79 so as to be limited in its turning movement by the ends of the notch 79, while the projection 81 of the ring 65 extends into the notch 80 so as to be limited in its movement by the ends of the notch 80, and in this way the range of movement of the exposure time setting means and the exposure aperture setting means is predetermined. However, if desired, the limiting of the movement of the setting means can be provided in other ways. Of course, the length of the notches 79 and 80 corresponds to the movement of the exposure aperture setting means and exposure time setting means between their end positions.

The parts are shown in the same position in FIGS. 2 and 3. Thus, it will be noted that in this position of the parts the camming portion 58a of the cam 58 engages the cam follower portion 56a of the motion transmitting lever 56. This results in placing the end 56b of the motion transmitting lever 56 in engagement with the pin 64 of the exposure time setting means, and in this position of the parts the motion transmitting member 57 simply lies loosely with its cam follower portion 57a against the cam 58 with the end 57b of the motion transmitting lever 57 spaced from the pin 63. When the operator depresses the arm 5 the spring 52 will turn the drive ring 50 until the scanning structure 8 cannot move further as a result of the engagement of the scanning structure with the pointer of the galvanometer, and thus the angular position of the ring 50 will be determined by the lighting conditions as was the case with the drive means of FIG. 1. During the turning of the ring 50 the motion transmitting member 56 by engagement with the pin 64 turns the ring 65 so as to change the exposure time. In the event that the amount of light available is such as to require a change in the exposure aperture as well as in the exposure time, then when the exposure time setting means has reached the end of its range of movement the cam follower portions 56a will have reached the end of the camming portion 58a and will then start to move along the camming portion 58c of the cam 58. The camming portion 58c has the configuration of an Archimedian spiral, with the result that while the cam follower portion moves along the camming portion 58c the lever 56 turns with respect to the turning drive ring 50 and its end 56b simply slides along the pin 64 without angularly turning the latter so that the exposure time means remains in its end position. At the instant when the cam follower portion 56a reaches the junction of the camming portions 58a and 58c of the cam 50, the end 57b of the motion transmitting lever 57 engages the pin 63 so that during the movement of the cam follower portion 56a along the camming portion 58c the continued turning of the drive ring 50 causes the motion transmitting lever 57 to turn the pin 63 and thus act through the intermediate ring 70 on the ring 72 for changing the exposure aperture.

It will be noted that the ring 50 is formed with an arcuate slot 62 and with an arcuate notch 61. The pins 63 and 64 respectively extend through the notch 61 and the slot 62, and at the instant when the end 57b of the motion transmitting member 57 engages the pin 63, this pin is also engaged by the projection 61a at the lower end of the notch 61, so that this projection 61a of the ring 50 augments the action of the motion transmitting member 57 under these conditions. In the same way, when, as described below, the structure is set to first act on the exposure aperture setting means and then on the exposure time setting means, when the end 56b of the motion transmitting member 56 moves into engagement with the pin 64, assuming that the exposure aperture has already reached its end position, the end 62a of the slot 62 will engage the pin 64 simultaneously with the end 56b of the lever 56 so as to augment the action of the latter. If desired, however, it is possible to make the diameter of the cam 58 so small that the ends 57b and 56b of the levers 57 and 56, respectively do not engage the pins 63 and 64 when the exposure aperture setting means and the exposure time setting means are respectively the second setting means to be automatically actuated, and in such an event only the projection 61a and the end 62a of the slot 62 will operate to actuate the second setting means which is automatically operated during one given cycle of operations.

Assuming that with the parts in the position of FIGS. 2 and 3 the largest exposure aperture and the longest exposure time are provided, then it is clear that the operation first of the exposure time setting means to reduce the exposure time to its minimum value before actuation of the exposure aperture setting means results in the best possible photograph from the standpoint of a moving subject, and therefore the operator will place the parts in the position shown in FIGS. 2 and 3, which is to say the operator will place the cam 58 in the position of FIGS. 2 and 3, when it is desired to make the best possible photograph of a moving subject.

Upon release of the structure which carries the arm 5, this structure will be returned to its rest position by the return spring which is stronger than the spring 52, and the ring 50 will return to its starting position determined by the movement of the scanning structure to a rest position. At the same time the springs 66 and 73 will operate to return the exposure time setting means and the exposure aperture setting means, respectively, to their rest positions. Thus, the engagement of the projection 81 with the upper end of the notch 80 will determine the rest position of the exposure time setting means, while the engagement of the arm 71 with the lower end of the notch 79 will determine the rest position of the exposure aperture setting means.

Assuming that it is desired to provide a type of automatic operation which will produce the greatest possible depth of field, the operator will turn the ring 59 through 180° so as to locate the camming portion 58a in engagement with the cam follower portion 57a of the motion transmitting lever 57, and the parts are shown in this position in FIG. 4. For the sake of clarity the motion transmitting member 56 is shown in FIG. 4 turned to that position where its cam follower portion 56a engages the cam 58, although actually at this time the motion transmitting member 56 would simply rest loosely with one end against the exterior periphery of the motion transmitting member 57 and the cam follower portion 56a spaced from the periphery of the cam 58. The parts are shown with the lever 56 as illustrated in FIG. 4 to show the position which the lever 56 takes with respect to the drive ring 50 at the instant when the end 56b of the lever 56 and the end 62a of the slot 62 simultaneously engage the pin 64. It will be noted that the end 62a of the slot 62 and the end 56b of the lever 56 are aligned with each other and furthermore it will be noted that the angular distance through which the end 62a of the slot 62 and the end 56b of the lever 56 turn before engaging the pin 64 is equal to the angular distance in the direction of the arrow e of FIG. 4 through which the cam follower portion 57a moves along the camming portion 58a before reaching the end of this camming portion and the beginning of the camming portion 58c. When the operator releases the ring 50 to the force of the drive spring 52 with the parts in the position of FIG. 4 the drive ring 50 will of course turn in the direction of the arrow e so as to move the lever 57 in a clockwise direction, as viewed in FIG. 4, and the movement of the pin 63 and thus actuation of the exposure aperture setting means will continue until the cam follower portion 57a reaches the end of the camming portion 56a. During movement along the camming portion 58c there will be no further turning of the pin 63 and no further setting of the exposure aperture setting means because of the curvature of the camming portion 58c as described above, and instead at the instant when the cam follower portion 57a reaches the end of the camming portion 58a the end 56b of the lever 56 and the end 62a of the slot 62 will engage the pin 64 so as to start to reduce the exposure time, in the event that the lighting conditions are such that the ring 50 continues to turn through an angle larger than that required for the movement of the exposure aperture setting means through its entire range of movement. Thus, with the parts in the position of FIG. 4 a photograph having the greatest possible depth of field will be provided.

With the embodiment of FIGS. 2–4, the specific settings as referred to above in connection with the embodiment of FIG. 1 can also be made.

While the invention has been illustrated and described as embodied in automatic cameras, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a camera, in combination, exposure time setting means having a rest position and being movable, while setting the exposure time, from said rest position through a predetermined range of movement; exposure aperture setting means having a rest position and being movable, during setting of the exposure aperture, from said rest position through a predetermined range of movement; drive means adapted to be controlled by the lighting conditions and adapted to be released for operation by the operator; motion transmitting means operatively connected to said drive means to be driven thereby and being movable between two positions, said motion transmitting means in one of its positions cooperating first with said exposure time setting means to move the latter through its range of movement and then with said exposure aperture setting means to move the latter through its range of movement and said motion transmitting means in the other of its positions cooperating first with said exposure aperture setting means to move the same through its range of movement and then with said exposure time setting means to move the latter through its range of movement; and manually operable selecting means cooperating with said motion transmitting means for placing the latter, before release of said drive means, in said one or said other position thereof.

2. In a camera, in combination, exposure time setting means and exposure aperture setting means each having a rest position and being movable from said rest position through a predetermined range of movement, and each of said setting means having a driving portion; drive means adapted to be controlled by the lighting conditions and adapted to be released for operation by the operator; motion transmitting means operatively connected to said drive means to be driven thereby and being movable between two positions, said motion transmitting means in one of its positions engaging said driving portion of said exposure time setting means and in the other of said positions engaging said driving portion of said exposure aperture setting means; and manually operable selecting means cooperating with said motion transmitting means for placing the latter, before release of said drive means, in said one or said other position so that when said drive means is released said motion transmitting means will move said exposure time setting means or said exposure aperture setting means through said range of movement thereof, said motion transmitting means engaging the driving portion of the non-selected setting means after the selected setting means has been moved through said range of movement thereof.

3. In a camera, in combustion, exposure time setting means and exposure aperture setting means each having a rest position and being movable from said rest position through a predetermined range of movement, and each of said setting means having a driving portion; drive means adapted to be controlled by the lighting conditions and adapted to be released for operation by the operator; motion transmitting means operatively connected to said drive means to be driven thereby and being movable between two positions, said motion transmitting means in one of its positions engaging said driving portion of said exposure time setting means and in the other of said positions engaging said driving portion of said exposure aperture setting means; and manually operable cam means cooperating with said motion transmitting means for placing the latter, before release of said drive means, in one or the other of said positions thereof so that said motion transmitting means will move a selected one of said setting means through its range of movement upon release by the operator of said drive means, said motion transmitting means engaging the driving portion of the non-selected setting means after moving the selected setting means through its range of movement.

4. In a camera as recited in claim 1, said motion transmitting means including an elongated motion transmitting member operatively connected to said drive means to be moved thereby from a rest position in a predetermined direction upon release by the operator of said drive means, said manually operable selecting means cooperating with said motion transmitting member for placing the latter in a first position for movement along a first path in said direction upon release by the operator of said drive means and for placing said motion transmitting member in a second position for movement in said direction along a second path upon release by the operator of said drive means, said exposure time setting means having a portion formed with a first shoulder engaged by said motion transmitting member when the latter is placed in said one position before moving along said first path and said exposure time setting means having said portion thereof formed with a second shoulder located along said second path and displaced in said direction from said first shoulder so that said second shoulder will be engaged by said motion transmitting member only after the latter has moved through a predetermined distance along said second path, said exposure aperture setting means being formed with a first shoulder engaged by said motion transmitting member when the latter is in said other position thereof before movement of said motion transmitting member along said second path, said exposure aperture setting means being formed with a second shoulder displaced in said direction from said first shoulder of said exposure aperture setting means and located along said first path of movement of said motion transmitting member, whereby when said motion transmitting member is placed in said one position it will operate first said exposure time setting means and then said exposure aperture setting means while when said motion transmitting member is in said other position it will operate first said exposure aperture setting means and then said exposure time setting means.

5. In a camera as recited in claim 4, the displacement of the second shoulder of each of said setting means in said direction from said first shoulder thereof being equal to the predetermined range of movement of each of said setting means.

6. In a camera as recited in claim 5, a lever pivotally connected to said drive means and carrying said motion transmitting member to support the latter for movement between said positions thereof.

7. In a camera as recited in claim 1, said drive means being rotary and said motion transmitting means including an elongated motion transmitting member extending substantially parallel to the axis of rotation of said rotary drive means and being operatively connected thereto to be moved thereby, said manually operable selecting means cooperating with said motion transmitting member for locating the latter at two positions where said motion transmitting member is respectively located at two different distances from said axis for movement by said drive means along two different concentric cylinders, said exposure time setting means and said exposure aperture setting means both being rotary and coaxial with each other and with said rotary drive means, each of said setting means being formed with a pair of shoulders respectively located along said circles and displaced from each other in the direction of movement of said motion transmitting member by said drive means with one shoulder of each setting means located closely adjacent to said motion transmitting member when the latter is in a rest position and the other shoulder of each setting means being approached by said motion transmitting member only when the latter is moved by said drive means, said one shoulder of one of said setting means being located along the cylinder of smaller diameter and the other shoulder of said one setting means being located along the cylinder of larger diameter while said one shoulder of the other setting means is located along said cylinder of larger diameter and said other shoulder of said other setting means is located along said cylinder of smaller diameter, whereby depending upon the position of said motion transmitting means selected by the operator a selected one of said setting means will be operated before the other.

8. In a camera as recited in claim 7, said selecting means being in the form of a rotary member having a camming edge engaging said motion transmitting member for radially displacing the latter between said cylinders.

9. In a camera as recited in claim 7, a stationary guide plate formed with a radial slot through which said motion transmitting member extends and along which said motion transmitting member moves between said cylinders and said guide plate being formed with a pair of arcuate slots communicating with said radial slot and respectively located along said cylinders for receiving said motion transmitting member and guiding the latter for movement along one or the other of said cylinders.

10. In a camera as recited in claim 7, each of said setting means including a pair of rotary plates one of which is formed with said shoulders and the other of which performs the actual adjustment, and each setting means including a spring maintaining said plates at a predetermined angular position with respect to each other until the end of the range of movement of each setting means is reached after which only the plate which is formed with the shoulders continues to move in opposition to the force of the spring.

11. In a camera, in combination, exposure time setting means for setting the exposure time of the camera and exposure aperture setting means for setting the exposure aperture of the camera, each of said setting means having a driving portion; drive means adapted to be controlled by the lighting conditions and adapted to be released for operation by the operator; a pair of motion transmitting members turnably carried by said drive means for movement therewith as well as for turning movement with respect thereto; and manually operable cam means engaging said motion transmitting members for placing one or the other of said members, before release of said drive means, in a position where it will engage a driving portion of one of said setting means upon release of said drive means, so that a selected one of said setting means can be operated according to the position of said cam means.

12. In a camera, in combination, rotary, coaxial exposure time setting means and exposure aperture setting means for respectively setting the exposure time and exposure aperture of the camera, each setting means carrying a driving pin extending parallel to the common axis of both of said setting means; rotary drive means coaxial with the common axis of both of said setting means and adapted to be controlled by the lighting conditions as well as to be released for operation by the operator; a pair of motion transmitting members pivotally carried by said rotary drive means for rotary movement therewith as well as for turning movement with respect thereto, said drive pins both extending through a plane in which both of said motion transmitting members are located; and manually operable cam means engaging said motion transmitting members for placing one or the other of said motion transmitting members in driving engagement with one or the other of said drive pins, before release of said drive means, whereby upon release of said drive means a selected one of said setting means will be operated.

13. In a camera, in combination, rotary coaxial exposure time setting means and exposure aperture setting means for respectively setting the exposure time and exposure aperture of the camera, each setting means carrying a driving pin extending parallel to the common axis of both of said setting means; rotary drive means coaxial with the common axis of both of said setting means and adapted to be controlled by the lighting conditions as well as to be released for operation by the operator; a pair of motion transmitting members pivotally carried by said rotary drive means for rotary movement therewith as well as for turning movement with respect thereto, said drive pins both extending through a plane in which both of said motion transmitting members are located; and manually operable cam means cooperating with said motion transmitting members for placing one or the other of said motion transmitting members in driving engagement with one or the other of said drive pins whereby upon release of said drive means a selected one of said setting means will be operated, said cam means placing the non-selected motion transmitting member in engagement with the non-selected pin of the non-selected setting means after the selected motion transmitting member has moved the selected pin of the selected setting means through a given angular distance so that first the selected and then the non-selected setting means will be operated.

14. In a camera, in combination, rotary, coaxial exposure time setting means and exposure aperture setting means for respectively setting the exposure time and exposure aperture of the camera, each setting means carrying a driving pin extending parallel to the common axis of both of said setting means; rotary drive means coaxial with the common axis of both of said setting means and adapted to be controlled by the lighting conditions as well as to be released for operation by the operator; a pair of motion transmitting members pivotally carried by said rotary drive means for rotary movement therewith as well as for turning movement with respect thereto, said drive pins both extending through a plane in which both of said motion transmitting members are located; and manually operable cam means cooperating with said motion transmitting members for placing one or the other of said motion transmitting members in driving engagement with one or the other of said drive pins whereby upon release of said drive means a selected one of said setting means will be operated, each of said motion transmitting members being in the form of a two-armed lever one arm of which terminates in an end portion adapted to cooperate with a driving pin and the other arm of which terminates in an end portion which functions as a cam follower and cooperates with said cam means.

15. In a camera, in combination, rotary, coaxial exposure time setting means and exposure aperture setting means for respectively setting the exposure time and exposure aperture of the camera, each setting means carrying a driving pin extending parallel to the common axis of both of said setting means; rotary drive means coaxial with the common axis of both of said setting means and adapted to be controlled by the lighting conditions as well as to be released for operation by the operator; a pair of motion transmitting members pivotally carried by said rotary drive means for rotary movement therewith as well as for turning movement with respect thereto, said drive pins both extending through a plane in which both of said motion transmitting members are located; and manually operable cam means cooperating with said motion transmitting members for placing one or the other of said motion transmitting members in driving engagement with one or the other of said drive pins whereby upon release of said drive means a selected one of said setting means will be operated, one of said drive pins being fixed directly to one of said setting means and the other setting means including an intermediate ring coupled to the remainder of said other setting means and carrying the other of said drive pins.

References Cited in the file of this patent

UNITED STATES PATENTS

| | | |
|---|---|---|
| 2,868,095 | Gebele | Jan. 13, 1959 |
| 2,913,969 | Fauhaber | Nov. 24, 1959 |
| 2,923,216 | Greger | Feb. 2, 1960 |
| 2,969,004 | Gebele | Jan. 24, 1961 |
| 2,972,289 | Melle | Feb. 21, 1961 |
| 2,984,164 | Melle | May 16, 1961 |